United States Patent
Kelley et al.

(10) Patent No.: US 6,697,832 B1
(45) Date of Patent: Feb. 24, 2004

(54) FLOATING-POINT PROCESSOR WITH IMPROVED INTERMEDIATE RESULT HANDLING

(75) Inventors: John Kelley, San Francisco, CA (US); Ying-Wai Ho, Los Altos, CA (US)

(73) Assignee: Mips Technologies, Inc., Mountain View, CA (US)

(*) Notice: Subject to any disclaimer, the term of this patent is extended or adjusted under 35 U.S.C. 154(b) by 0 days.

(21) Appl. No.: 09/364,514

(22) Filed: Jul. 30, 1999

(51) Int. Cl.[7] .................................................. G06F 7/38
(52) U.S. Cl. ....................................................... 708/501
(58) Field of Search .......................... 708/501, 496–497

(56) References Cited

U.S. PATENT DOCUMENTS

| | | | |
|---|---|---|---|
| 4,156,279 A | 5/1979 | Wilhite ........................ 364/200 |
| 4,511,990 A | 4/1985 | Hagiwara et al. ........... 364/748 |
| 4,839,846 A | 6/1989 | Hirose et al. ................ 708/497 |
| 4,866,652 A * | 9/1989 | Chu et al. .................... 708/501 |
| 4,879,676 A | 11/1989 | Hansen ........................ 364/748 |
| 5,025,407 A | 6/1991 | Gulley et al. ................ 364/754 |
| 5,038,313 A | 8/1991 | Kojima ...................... 364/736.5 |
| 5,159,665 A | 10/1992 | Priem et al. ................ 395/134 |
| 5,185,713 A | 2/1993 | Kobunaya ................... 364/748 |
| 5,206,823 A | 4/1993 | Hesson ........................ 364/748 |
| 5,220,524 A | 6/1993 | Hesson ........................ 708/502 |
| 5,257,216 A | 10/1993 | Sweedler .................... 364/748 |
| 5,278,949 A | 1/1994 | Thayer ........................ 395/134 |
| 5,341,321 A | 8/1994 | Karp et al. .................. 364/748 |
| 5,357,599 A | 10/1994 | Luken ......................... 395/134 |
| 5,359,548 A | 10/1994 | Yoshizawa et al. ......... 364/748 |
| 5,367,650 A | 11/1994 | Sharangpani et al. ....... 395/375 |
| 5,392,228 A | 2/1995 | Burgess et al. ......... 364/715.04 |
| 5,420,966 A | 5/1995 | Silverbrook ................. 395/122 |
| 5,420,971 A | 5/1995 | Westerink et al. .......... 395/133 |
| 5,511,016 A | 4/1996 | Bechade ...................... 364/745 |
| 5,517,438 A * | 5/1996 | Dao-Trong et al. ......... 708/501 |
| 5,530,663 A * | 6/1996 | Garcia et al. ................ 708/501 |
| 5,550,767 A | 8/1996 | Taborn et al. ............... 364/745 |
| 5,550,768 A | 8/1996 | Ogilvie et al. .............. 364/748 |
| 5,553,015 A | 9/1996 | Elliott et al. ................ 364/748 |
| 5,602,769 A | 2/1997 | Yu et al. ..................... 364/748 |
| 5,631,859 A | 5/1997 | Markstein et al. .......... 364/748 |
| 5,652,875 A | 7/1997 | Taylor ......................... 395/500 |
| 5,671,170 A | 9/1997 | Markstein et al. .......... 364/748 |

(List continued on next page.)

OTHER PUBLICATIONS

IEEE Standard for Binary Floating–Point Arithmetic.
TMS32010 User's Guide, Texas Instruments, 1983, p. 1183.
AltiVec™ Technology Programming Environments manual, Preliminary REV 0.2, May 1998, pp. 4–16 thru 4–19 (4 pages total).
Heinrich, Joe, MIPS R4000 Microprocessor User's manual, Second Edition, MIPS Technologies, 1994, pp. 154–155, 157, 159, 161, 168, 170–171, B–13, B17, B–19, B–21, B–23, B–27, B–38, B–40 and B–62 (19 pages total). Note: The page count of this document was cited in an International Search Report from a PCT Application.
3DNow!™ Technology manual, Advanced Micro Devices, 1998, pp/ i–x and 1–62 (72 pages total).

(List continued on next page.)

*Primary Examiner*—Tan V. Mai
(74) *Attorney, Agent, or Firm*—Dinh & Associates

(57) ABSTRACT

Floating-point processors capable of performing multiply-add (Madd) operations and incorporating improved intermediate result handling capability. The floating-point processor includes a multiplier unit coupled to an adder unit. The intermediate result from the multiplier unit is processed (i.e., rounded) into representations that are more easily managed in the adder unit. However, some of the processing (i.e., normalization and exponent adjustment) to generate an IEEE-compliant representation is deferred to the adder unit. By combining and deferring some of the processing steps for the intermediate result, circuit complexity is reduced and operational performance is improved.

22 Claims, 5 Drawing Sheets

U.S. PATENT DOCUMENTS

| | | | |
|---|---|---|---|
| 5,671,401 A | 9/1997 | Harrell | 395/505 |
| 5,701,442 A | 12/1997 | Ronen | 395/500 |
| 5,720,019 A | 2/1998 | Koss et al. | 395/134 |
| 5,726,927 A | 3/1998 | Wolrich et al. | 364/754 |
| 5,729,724 A | 3/1998 | Sharangpani et al. | 395/563 |
| 5,768,170 A | 6/1998 | Smith | 364/748.1 |
| 5,774,709 A | 6/1998 | Worrell | 395/580 |
| 5,790,827 A | 8/1998 | Leung | 395/392 |
| 5,793,661 A | 8/1998 | Dulong et al. | 364/750.5 |
| 5,805,486 A | 9/1998 | Sharangpani | 364/736.04 |
| 5,809,294 A | 9/1998 | Ando | 395/580 |
| 5,815,695 A | 9/1998 | James et al. | 395/561 |
| 5,847,979 A | 12/1998 | Wong et al. | 364/748.06 |
| 5,848,269 A | 12/1998 | Hara | 395/586 |
| 5,852,726 A | 12/1998 | Lin et al. | 395/376 |
| 5,867,682 A | 2/1999 | Witt et al. | 395/386 |
| 5,880,983 A * | 3/1999 | Elliott et al. | 708/501 |
| 5,880,984 A | 3/1999 | Burchfiel et al. | 364/748.07 |
| 5,889,690 A * | 3/1999 | Arakawa | 708/501 |
| 5,892,698 A * | 4/1999 | Naffziger | 708/501 |
| 5,901,076 A | 5/1999 | Lynch | 364/748.11 |
| 5,923,577 A | 7/1999 | Wong et al. | 364/748.08 |
| 5,928,316 A * | 7/1999 | Wong et al. | 708/501 |
| 5,953,241 A | 9/1999 | Hansen et al. | 364/748.07 |
| 5,995,122 A | 11/1999 | Hsieh et al. | 345/523 |
| 5,996,066 A | 11/1999 | Yung | 712/221 |
| 5,999,960 A * | 12/1999 | Gerwig | 708/501 |
| 6,035,316 A | 3/2000 | Peleg et al. | 708/523 |
| 6,065,115 A | 5/2000 | Sharangpani et al. | 712/235 |
| 6,115,729 A | 9/2000 | Matheny et al. | 708/501 |
| 6,169,554 B1 | 1/2001 | Deering | 345/434 |
| 6,175,370 B1 | 1/2001 | Kunimatsu | 345/434 |
| 6,175,851 B1 | 1/2001 | Iourcha et al. | 708/505 |
| 6,199,089 B1 | 3/2001 | Mansingh | 708/497 |
| 6,249,798 B1 | 6/2001 | Golliver et al. | 708/490 |
| 6,268,875 B1 | 7/2001 | Duluk, Jr. et al. | 345/506 |
| 6,275,838 B1 * | 8/2001 | Blomgren et al. | 708/501 |
| 6,285,378 B1 | 9/2001 | Duluk, Jr. et al. | 345/441 |
| 6,285,779 B1 | 9/2001 | Lapidous et al. | 382/106 |
| 6,426,746 B2 | 7/2002 | Hsieh et al. | 345/419 |
| 6,510,446 B1 | 1/2003 | Fukagawa | 708/497 |

OTHER PUBLICATIONS

Higakl et al., A 2.5 GFLOPS 6.5 Million Polygons Per Second 4–Way VLIW Geometry Processor With SIMD Instructions And A Software Bypass Mechanism, Nakahara–ku, Kawasaki, Japan.

Higaki et al., Four–Way VLIW Geometry Processor for 3D Graphics Applications, Dec. 1, 1999, pp. 39–47.

Hughes, PL.I Programming, 1973, John Wiley & Sons, pp. 5, 15–16, 74–75, 188–189, 217, 411–416, 423–424, and 689–690.

Higaki et al., "A 2.5 GFLOPS 6.5 Million Polygons per Second 4–Way VLIW Geometry Processor with SIMD Instructions and a Software Bypass Mechanism," IEEE International Solid–State Circuits Configuration, 1999.

Ito, Masayuki et al., "Efficient Initial Approximation for Multiplicative Division and Square Root by a Multiplication with Operand Modification," IEEE Transactions on Computers, vol. 46, pp. 495–498, Apr. 1997.

Diefendorff, Keith et al., "AltiVec Extension to PowerPC Accelerates Media Processing," IEEE Micro, pp. 85–95, Mar. Apr. 2000.

Kubosawa et al., "A 2.5–GFLOPS, 6.5 Million Polygons per Second, Four–Way VLIW Geometry Processor with SIMD Instructions and a Software Bypass Mechanism," IEEE Journal of Solid–State Circuits, vol. 34, No. 11, pp. 1619–1626, Nov. 1999.

* cited by examiner $$\underset{310}{\pm 1} . \underset{312}{x\,x\,x\,-\,-\,x\,x} \cdot 2^{\underset{314}{exp}}$$

$$0\,1\,.\,x\,x\,x\,-\,-\,x\,\overset{320}{\underset{\downarrow}{x}}\,x\,x$$

$$\underset{608}{\downarrow}\phantom{xxxxx}\underset{610a}{\downarrow}$$
0 1 . x x x - - x x x x
1 x . x x x - - x x x x
$$\phantom{xxxxxxxxx}\underset{610b}{\uparrow}$$

FLOATING-POINT PROCESSOR WITH IMPROVED INTERMEDIATE RESULT HANDLING

CROSS-REFERENCE TO RELATED APPLICATIONS

The following related patent applications filed on the same day herewith are hereby incorporated by reference in their entirety for all purposes:

U.S. patent application Ser. No. 09/364,512, entitled "Processor with Improved Accuracy for Multiply-Add Operations," by Ying-wai Ho, John Kelley, and James Jiang;

U.S. patent application Ser. No. 09/363,638, entitled "Method and Apparatus for Predicting Floating-Point Exceptions," by James Jiang, Ying-wai Ho, and John Kelley;

U.S. patent application Ser. No 09/363,637, entitled "System and Method for Improving the Accuracy of Reciprocal and Reciprocal Square Root Operations Performed by a Floating-Point Unit," by Ying-wai Ho, Michael Schulte, and John Kelley;

U.S. patent application Ser. No. 09/364,786, entitled "Processor Having a Compare Extension of an Instruction Set Architecture," by Radhika Thekkath, Michael Uhler, Ying-wai Ho, and Chandlee Harrell;

U.S. patent application Ser. No. 09/364,789, entitled "Processor Having a Conditional Branch Extension of an Instruction Set Architecture," by Radhika Thekkath, Michael Uhler, Ying-wai Ho, and Chandlee Harrell; and U.S. patent application Ser. No. 09/364,787, entitled "Processor Having an Arithmetic Extension of an Instruction Set Architecture," by Radhika Thekkath, Michael Uhler, Ying-wai Ho, and Chandlee Harrell.

BACKGROUND OF THE INVENTION

The present invention relates to floating-point processors, and more particularly to floating-point processors having improved intermediate result handling capability for multiply-add operations.

In digital processing systems, numerical data is typically expressed using integer or floating-point representation. Floating-point representation is preferred in many applications because of its ability to express a wide range of values and its ease of manipulation for some specified operations. A floating-point representation includes a mantissa (or significand), an exponent, and a sign component. The mantissa represents the integer portion before the binary (or decimal) point as well as the fractional portion after the binary point. The mantissa typically ranges from "1" to less than the value of the "base", which is two for binary but ten for decimal (i.e., $1.0 \leq$ mantissa$<2.0$ for binary numbers). A special representation is typically used to denote 0.0. The exponent represents a scaling factor that is multiplied with the mantissa to arrive at the number being represented. The exponent is typically expressed as a power of two. Finally, the sign component expresses the sign of the number, i.e., whether the number is positive or negative. Floating-point representations are also defined by "IEEE Standard for Binary Floating-Point Arithmetic," which is referred to herein as the IEEE-754 standard (or simply the IEEE standard) and incorporated herein by reference in its entirety for all purposes.

Many operations can be performed on floating-point numbers, including arithmetic operations such as addition, subtraction, and multiplication. For arithmetic operations, the IEEE standard provides guidelines to be followed to generate a unique answer for each floating-point operation. In particular, the IEEE standard describes the processing to be performed on the result from a particular operation (e.g., multiply, add), the precision of the resultant output, and the data format to be used. For example, the IEEE standard defines several rounding modes available for the results from add and multiply operations, and the bit position at which the rounding is to be performed. The requirements ensure identical results from different implementations of IEEE-compliant floating-point processors.

In most floating-point processors, and as defined by the IEEE standard, multiplication is performed on two "normalized" operands. A normalized floating-point number is represented by a mantissa having a "1" value in the most significant bit (MSB) location and a format of 1.xxx--xx, where each "x" represents one bit that is either a one or a zero. As defined by the IEEE standard, the fractional portion "xxx--xx" represents 23 bits after the binary point for normalized single precision numbers and 52 bits for normalized double precision numbers. For a normalized number, the mantissa ranges from one to two ($1.0 \leq$ mantissa$<2.0$). Multiplication of two normalized operands produces a resultant mantissa that ranges from one to four ($1.0 \leq$ mantissa$<4.0$) and has a format of 01.xxx--xxxx or 1x.xxx--xxxx, where the fractional portion "xxx--xxxx" represents more than 23 bits (or 52 bits) for the unrounded multiplier result with single (or double) precision numbers. Post-processing is then performed on the result (i.e., the resultant mantissa), which includes, as necessary, normalization, rounding, and possible re-normalization. Floating-point multiplication is typically performed by a specially designed unit that implements a multiplication algorithm (such as the Booth or modified Booth algorithm).

Many applications perform multiplication on two operands and addition (or subtraction) of the resultant product with a third operand. This multiply-add (or Madd) operation is common, for example, in digital signal processing. Madd operations are used for computing filter functions, convolution, correlation, matrix transformations, and other functions. Madd operations are also commonly used in geometric computation for (3-D) graphics applications.

Conventionally, a Madd operation can be achieved by sequentially performing a multiply (MUL) operation followed by an add (ADD) operation. Performing the operations sequentially results in long processing delay. Improved performance can often be obtained by performing the Madd operation using a specially designed unit that also supports conventional floating-point multiplication and addition.

As noted above, for multiply and Madd operations, post-processing is typically performed on the result from the multiply operation. The post-processing increases the processing time of these floating-point operations. The increased processing time is compounded for the Madd operation, which is a concatenation of a multiply and an add operation. Accordingly, for Madd operations, techniques that simplify the post-processing of the intermediate result from the multiply operation and reduce the overall processing time are highly desirable. It is also desirable that these techniques generate Madd output that fulfills IEEE rounding requirement, as if the Madd operation were achieved by a MUL operation followed by an ADD operation.

SUMMARY OF THE INVENTION

The invention provides floating-point processors capable of performing multiply-add (Madd) operations and incorporating improved intermediate result handling capability. The floating-point processor includes a multiplier unit coupled to an adder unit. The intermediate result from the multiplier unit is processed (i.e., rounded) into a representation that is more easily managed in the adder unit. However, some of the processing (i.e., normalization) to generate an IEEE-compliant representation is deferred to the adder unit. By deferring the normalization of the intermediate result, the corresponding adjustment of the exponent from the multiplier unit is also avoided (and performed later when the normalization is performed). By combining and deferring some of the processing steps for the intermediate result, circuit complexity is reduced and operational performance is improved.

An embodiment of the invention provides a floating-point unit (FPU) configurable to perform Madd operations. The FPU includes a multiplier unit coupled to an adder unit. The multiplier unit is configured to receive and multiply mantissas for two operands to generate a multiplier output mantissa. The multiplier output mantissa is rounded and has a range greater than a normalized mantissa. The adder unit is configured to receive and combine the multiplier output mantissa and a mantissa for a third operand to generate a FPU output mantissa. The multiplier output mantissa can have a format of 01.xxx--xxxx or 1x.xxx--xxxx, and is rounded in accordance with IEEE standard. The FPU typically also includes additional units to process the exponents for the operands. The FPU can be incorporated within a processor or other hardware structure, and can also be implemented using hardware design languages (e.g., Verilog).

Another embodiment of the invention provides a floating-point processor configurable to perform Madd operations. The floating-point processor includes a multiplier unit coupled to an adder unit. The multiplier unit includes a multiplier array operatively coupled to a first rounding unit. The multiplier array is configured to receive and multiply mantissas for two operands. The first rounding unit is configured to round an output from the multiplier array. The adder unit includes a carry propagation adder (CPA), a second rounding unit, and a normalization unit. The CPA is configured to receive and combine a rounded mantissa from the multiplier unit and a mantissa for a third operand. The second rounding unit couples to the CPA and is configured to receive and round the mantissa from the CPA. The normalization unit couples to the second rounding unit and is configured to receive and normalize the rounded mantissa. Within the multiplier unit, another CPA can be coupled between the multiplier array and the first rounding unit and configured to receive and combine a sum output and a carry output from the multiplier array. Again, the floating-point processor typically includes additional units to process the exponents for the operands.

Yet another embodiment of the invention provides a method for performing a floating-point Madd operation. In accordance with the method, the mantissas for two operands are multiplied to generate a third mantissa, which is then rounded to generate a fourth mantissa. The fourth mantissa has a range greater than a normalized mantissa. The fourth mantissa is combined with a mantissa for a third operand to generate an output mantissa. The output mantissa can further be rounded and normalized to generate a representation that conforms to the IEEE standard.

The invention also provides computer program products that implement the embodiments described above.

The foregoing, together with other aspects of this invention, will become more apparent when referring to the following specification, claims, and accompanying drawings.

BRIEF DESCRIPTION OF THE DRAWINGS

FIG. 3A shows a representation of a floating-point number;

FIG. 3B shows two mantissa representations that can result from a multiply operation;

FIG. 3C shows a representation of a normalized but unrounded mantissa;

FIG. 3D shows a representation of a normalized mantissa that conforms to the IEEE standard;

FIG. 6A shows two mantissa representations for the mantissa from a carry propagation adder (CPA) within a multiplier unit of the FPU in FIG. 5; and FIG. 6B shows two mantissa representations for the mantissa from the rounding unit within the multiplier unit.

DESCRIPTION OF THE SPECIFIC EMBODIMENTS

Figure 1:
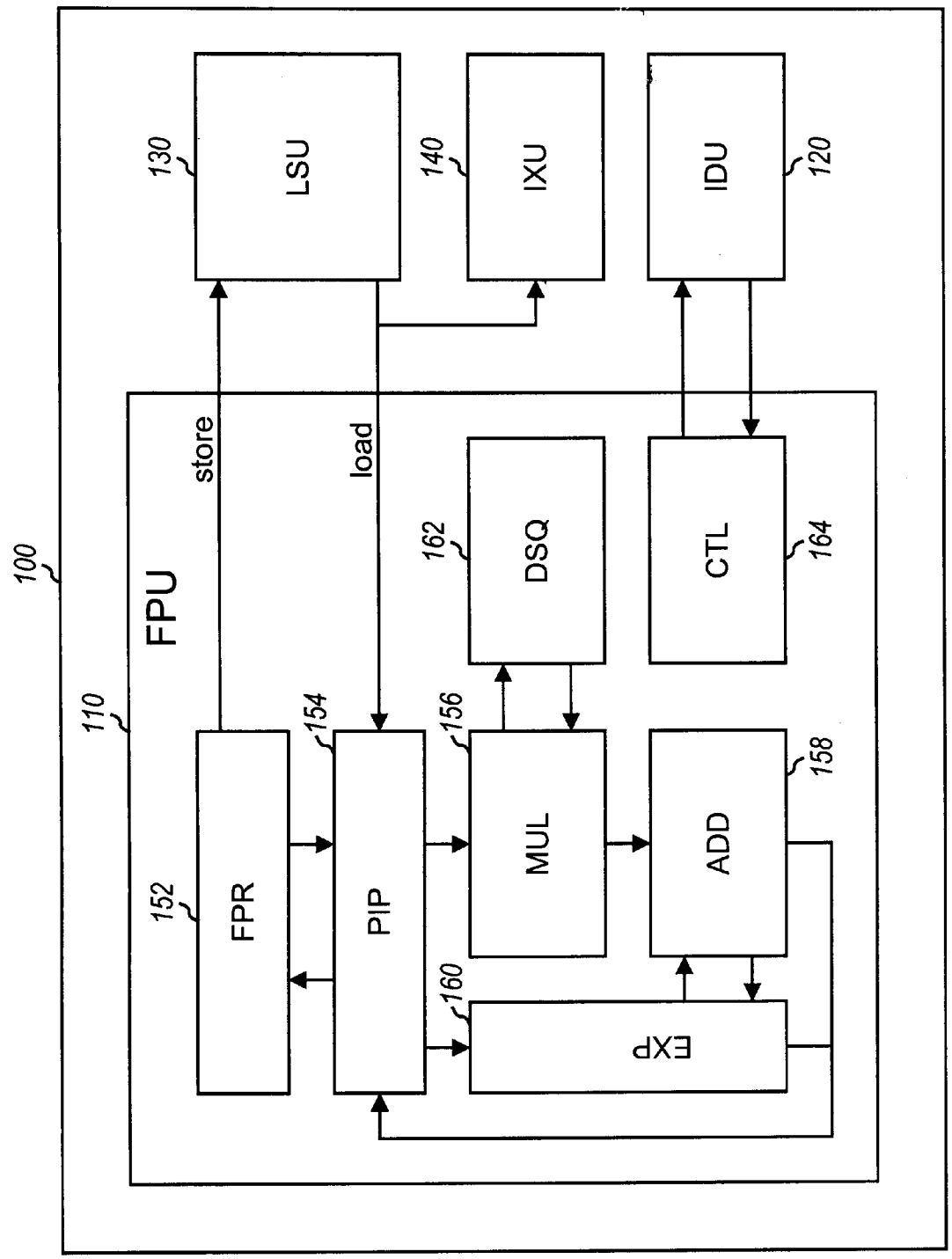
FIG. 1 shows a simplified diagram of an embodiment of a processor that incorporates a floating-point unit (FPU) of the invention.

FIG. 1 shows a simplified diagram of an embodiment of a processor 100 that incorporates a floating-point unit (FPU) 110 of the invention. As shown in the specific embodiment in FIG. 1, processor 100 further includes an instruction dispatch unit (IDU) 120, a load store unit (LSU) 130, and an integer execution unit (IXU) 140. IDU 120 decodes a sequence of instructions, dispatches floating-point instructions to FPU 110, and keeps track of the state of each dispatched floating-point instruction, resource and register dependencies, and the possibility of bypassing a resultant operand to the next FPU instruction. FPU 110 performs floating-point computations, as directed by IDU 120. LSU 130 interfaces with other elements (i.e., internal or external to processor 100) and provides data to, and receives data from FPU 110. For example, operands are loaded from LSU 130 to FPU 110 and results are provided from FPU 110 to LSU 130. IXU 140 performs integer computations, and is able to transfer data to, and receive data from FPU 110.

FIG. 1 also shows a block diagram of an embodiment of FPU 110. FPU 110 includes a floating-point register file (FPR) 152 that interfaces with LSU 130. FPR 152 includes a number of read ports (i.e., for reading up to three operands for each arithmetic operation and one operand for a store operation) and a number of write ports (i.e., for writing one operand for each arithmetic and load operation).

A floating-point pipe file (PIP) 154 couples to FPR 152 and further interfaces with LSU 130 and IXU 140. For each instruction, PIP 154 selects and receives operands from FPR 152, a load pipe file, a result pipe file, or a ROM. PIP 154 then unpacks the received operands (i.e., from an IEEE-compliant format) into an internal data format recognized by the processing units within FPU 110. PIP 154 also packs the results from FPU 110 into a data format (i.e., IEEE-compliant format) required by the external circuitry and provides the packed results to FPR 152.

A floating-point multiplier (MUL) 156 couples to PIP 154 and executes floating-point multiply instructions as well as the multiply portion of compound instructions such as a multiply-add (MADD) instruction. MUL 156 receives the mantissas of two operands from PIP 154. In an embodiment, MUL 156 is implemented with a multiplier array that generates a set of sum and carry outputs having full precision. The sum and carry are provided to, and combined in a carry-propagate adder (CPA) to generate a precise, unrounded resultant mantissa. The lower bits of the resultant mantissa are logically combined to form a "sticky" bit that, in combination with the round bit and the current rounding mode, are used to generate rounding information to be sent to a subsequent rounding unit within MUL 156. MUL 156 is described in further detail below.

A floating-point adder (ADD) 158 couples to PIP 154 and MUL 156. ADD 158 executes floating-point add and subtract instructions as well as the add portion of compound instructions such as MADD. ADD 158 receives two operands and performs floating-point magnitude addition/subtraction using, for example, a prescale adder (PSA) operated in parallel with a massive cancellation adder (MCA). The final output is selected from one of the adders (based upon, among other things, the exponent difference of the operands) and provided to PIP 154 for storage. Selection criteria for PSA and MCA is further described in the aforementioned U.S. patent application Ser. No. 09/364,512. ADD 158 is further described below.

A floating-point exponent unit (EXP) 160 couples to PIP 154 and ADD 158. EXP 160 receives the exponents of the operands from PIP 154, estimates an output exponent based on the operation being performed and the exponents of the operands, and adjusts the estimated output exponent based on the rounding and normalization performed on the mantissa (e.g., by MUL 156 and ADD 158). EXP 160 also performs other functions, such as overflow/underflow prediction and checks.

A floating-point divide/square-root unit (DSQ) 162 couples to MUL 156 and operates on the mantissas for divide and square-root instructions. DSQ 162 is designed to implement a particular algorithm (e.g., a radix-2 SRT or a radix-4 SRT algorithm).

A floating-point control unit (CTL) 164 is the control unit for FPU I 10. CTL 164 receives floating-point instructions and directs the operation of various units within FPU 110 to generate the proper output.

Figure 2:
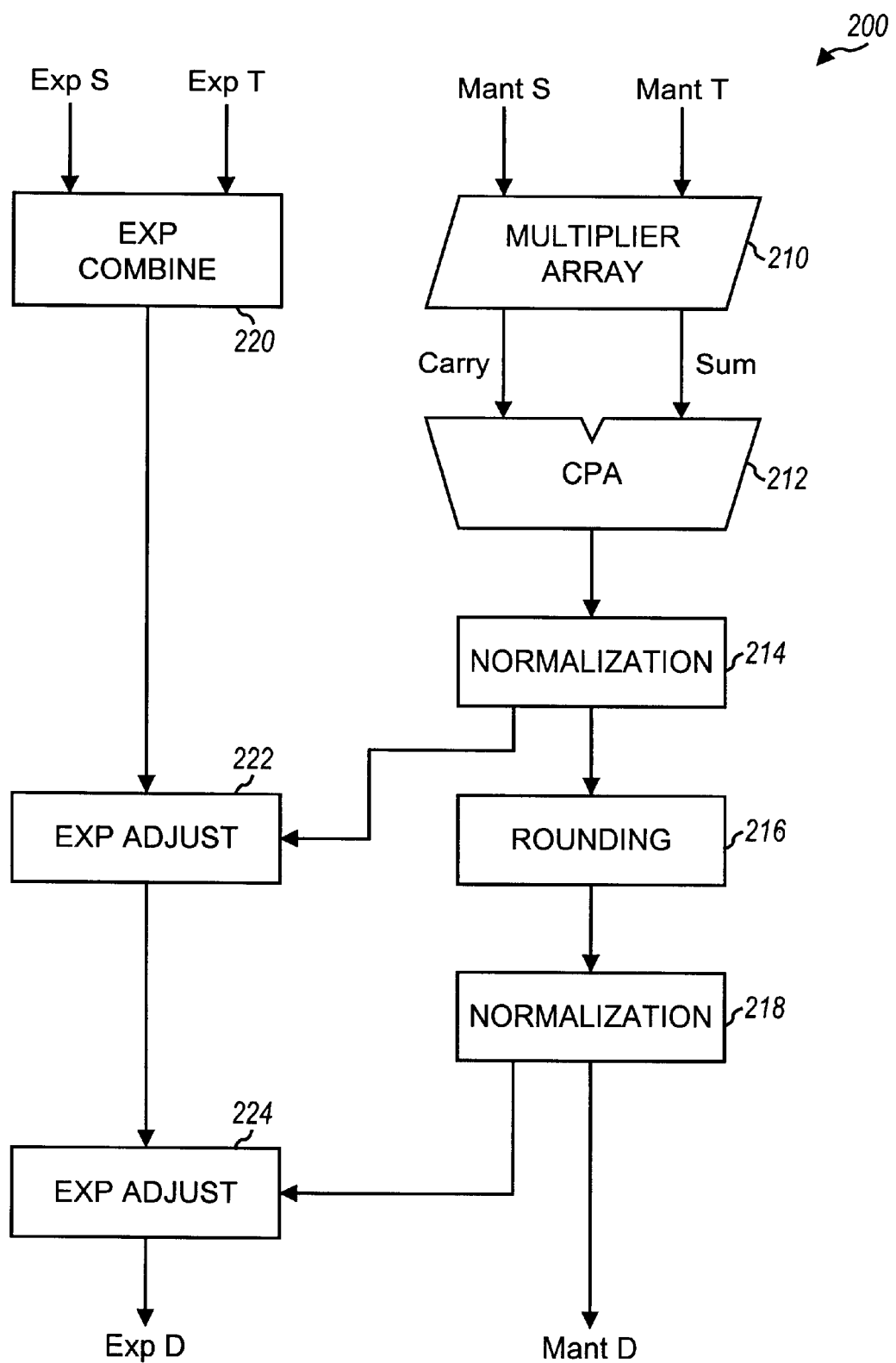
FIG. 2 shows a diagram of an embodiment of a floating-point multiplier unit that multiplies two operands and generates an IEEE-compliant output.

FIG. 2 shows a diagram of an embodiment of a generic floating-point multiplier unit 200 that multiplies two operands and generates an IEEE-compliant output. The mantissas, Mant S and Mant T, of the two operands are provided to a multiplier array 210. Array 210 can implement, for example, a Booth or modified Booth algorithm, and can include partial product generation logic and a number of carry-save adders. The partial product generation logic produces partial products based on the mantissas. The carry-save adders add a number of partial products together and send the outputs to other carry-save adders in a tree-like fashion until only two numbers are left, the final sum and carry. In a specific implementation, the carry-save adders take in four terms and combine them into two, but other configurations are possible.

Array 210 thus multiplies two input mantissas and provides an output in sum-and-carry format to a carry-propagation adder (CPA) 212. CPA 212 adds the sum and carry and provides a resultant mantissa to a normalization unit 214. The mantissa from CPA can have a 01.xxx--xxxx or 1x.xxx--xxxx format, and normalization unit 214 normalizes the mantissa (to place it into the 01.xxx--xxxx format) by performing a 1-bit right shift, if necessary. Normalization is further described below.

The exponents, Exp S and Exp T, of the two operands are provided to an exponent combination unit 220 that combines the two exponents for a multiply operation. The resultant exponent is provided to an exponent adjustment unit 222 that adjusts the exponent, as necessary, based on the normalization performed by normalization unit 214. For example, if a right shift of one bit is performed on the mantissa by normalization unit 214, the exponent is incremented by one.

The normalized mantissa is provided to a rounding unit 216. In general, multiplication of two N-bit numbers results in a product having 2N bits of precision. Rounding unit 216 rounds the normalized mantissa to an N-bit number in accordance with one of the rounding modes defined by the IEEE standard and provides the rounded mantissa to a normalization unit 218. If the mantissa overflows from 01.111--11 to 10.000--00 as a result of the rounding, normalization unit 218 normalizes the rounded mantissa to place it into the 01.xxx--xx format. The output from normalization unit 218 comprises the output mantissa from multiplier unit 200. Rounding is further described below.

The adjusted exponent from unit 222 is provided to a second exponent adjustment unit 224 that adjusts the exponent, as necessary, based on the normalization performed by normalization unit 218. The output from adjustment unit 224 comprises the output exponent from multiplier unit 200.

The IEEE standard defines the representation for floating-point numbers. The IEEE standard also provides guidelines to be followed in order to generate a unique result for each arithmetic operation. Specifically, the IEEE standard defines several rounding modes, the number of bits to maintain after the rounding operation, and the position of the bit in the mantissa to be rounded. The IEEE standard also mandates storing only the fractional portion of the mantissa (i.e., a leading "1" is assumed). Thus, normalization is performed to generate a mantissa having a fractional portion suitable for storing in the IEEE format.

FIG. 3A shows a representation of a floating-point number. The representation includes a sign bit 310, a fractional part 312, and an exponent 314. The mantissa has a range of 1.0 to less than 2.0 ($1.0 \leq$ mantissa$<2.0$). For a normalized mantissa having a 1.xxx--xx format, the leading bit is always a "1". In accordance with the IEEE standard, the leading one to the left of the binary point is implicit and is not represented in the IEEE format. The IEEE standard also defines the number of bits to be used for the fractional portion of the mantissa and the exponent, for single (32-bit) and double (64-bit) precision floating-point numbers.

FIG. 3B shows two mantissa representations that can result from a multiply operation. When performing multiplication of two normalized mantissas, each being within the range of 1.0 and 2.0 (i.e., corresponding to the 1.xxx--xx format) and having N bits of precision, the resultant mantissa can range from 1.0 to 4.0 (i.e., corresponding to a 01.xxx--xxxx or 1x.xxx--xxxx format) and having up to 2N bits of precision. Two bits to the left of the binary point are used to represent the range of 1.0 to 4.0. A normalization (e.g., a right shift of one bit position) can be performed whenever the resultant operand is 2.0 or greater to maintain the mantissa within the range of 1.0 and 2.0. The exponent is adjusted accordingly whenever a shift is performed (i.e., by incrementing the exponent by one for each right shift by one bit position).

FIG. 3C shows a representation of a normalized but unrounded mantissa. Since the resultant mantissa from the multiplier array can have up to 2N bits of precision, rounding is performed to provide a mantissa having N bits of precision, the same as that of the input mantissas. The IEEE standard defines the position of the bit to be rounded as well as the available rounding modes. Essentially, the mantissa is truncated past a defined bit position indicated by an arrow 320, and possibly incremented at this bit position. The increment bit is generated based on a round bit, a "sticky" bit, and the current rounding mode. The round bit is the bit to the right of arrow 320, and the sticky bit is the OR of all bits past the round bit. The rounding may generate a mantissa that requires re-normalization. When this occurs, a second normalization is performed.

FIG. 3D shows a representation of a normalized mantissa that conforms to the IEEE standard. The normalized mantissa has a range of 1.0 to 2.0 and N bits of precision.

The post-processing of the result for a multiply operation to generate an output that conforms to the IEEE standard includes the following steps:
1) Normalize the mantissa from a 01.xxx--xxxx or a 1x.xxx--xxxx format to a 01.xxx--xx format.
2) Adjust the exponent due to the mantissa normalization in step 1. In parallel, perform mantissa rounding according to the round and sticky bits and the selected rounding mode.
3) Normalize the mantissa again if the mantissa overflows from 01.111--11 to 10.000--00 after the mantissa rounding in step 2.
4) Adjust the exponent again if a normalization takes place in step 3.

Figure 4:
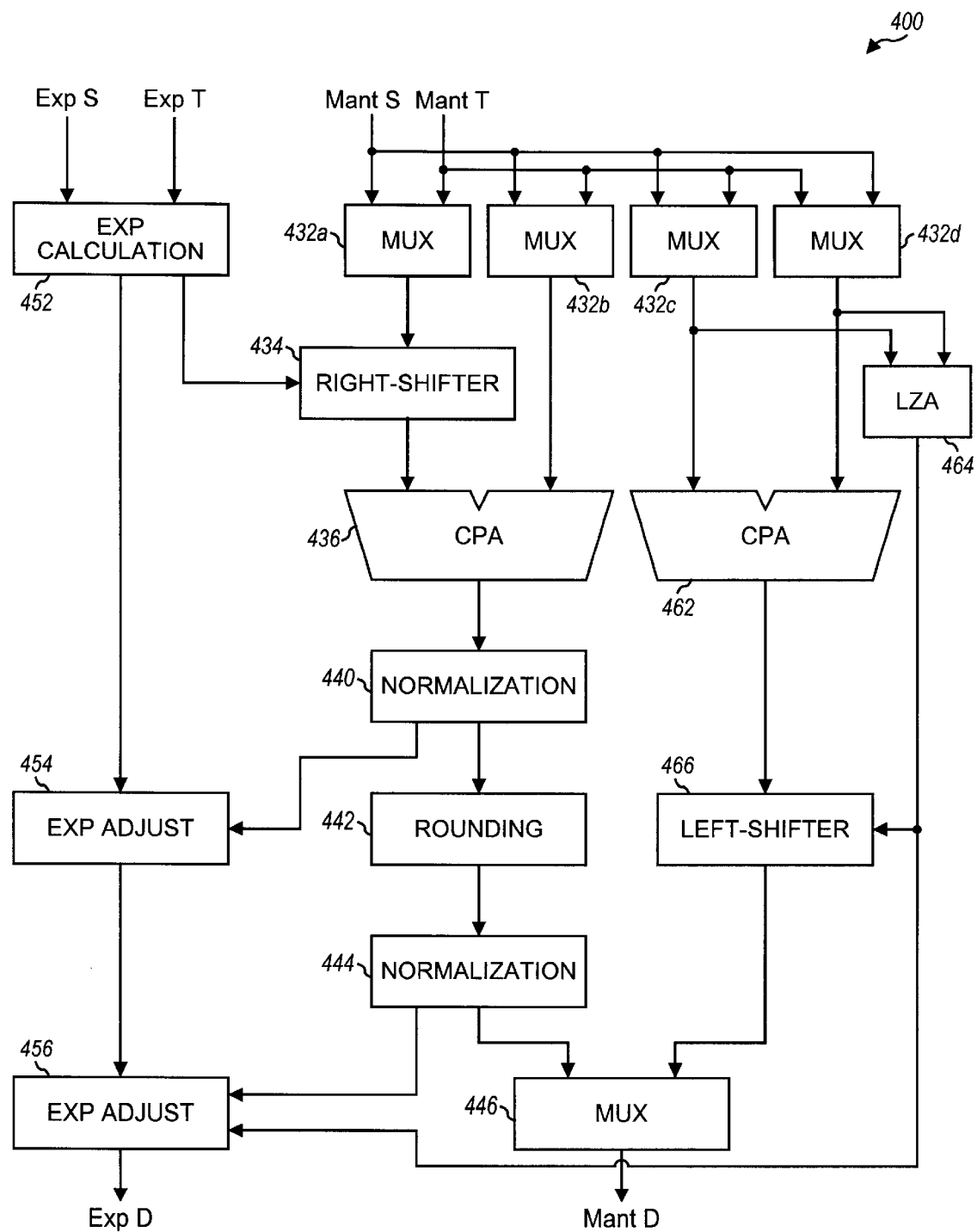
FIG. 4 shows a diagram of an embodiment of a floating-point adder unit that adds two operands.

FIG. 4 shows a diagram of an embodiment of a floating-point adder unit 400 that adds two operands. For improved performance (i.e., faster operating speed), adder unit 400 includes a prescale adder (PSA) and a massive cancellation adder (MCA) operated in parallel. Depending on the characteristics of the operands, the output from either the PSA or MCA is selected.

To perform a floating-point addition, the mantissas of the two operands are typically aligned by shifting one of the mantissas and adjusting its exponent until the exponents of the two operands are equal. The mantissas are then combined (e.g., added or subtracted), and the resultant mantissa is normalized. The number of shifts prior to the combination can be large (e.g., when adding a large number with a small number), and the number of shifts after the combination can also be large (e.g., when subtracting two operands having similar magnitudes). The PSA and MCA are designed to efficiently process most input conditions, even these two extreme conditions.

For the PSA, the mantissas for operands S and T are provided to MUXes 432a and 432b. MUX 432a selects the mantissa of the smaller operand and provides the selected mantissa to a right-shift unit 434. MUX 432b selects the mantissa of the larger operand and provides the selected mantissa to a CPA 436.

The exponents of operands S and T are provided to an exponent calculation unit 452 that determines the difference between the two exponents and a preliminary result exponent. Determination of the preliminary result exponent is dependent upon the arithmetic equation being performed, and is further described in the aforementioned U.S. patent application Ser. No. 09/363,638. The preliminary result exponent (e.g., the larger exponent when performing an add operation) is provided to an exponent adjustment unit 454 and the exponent difference is provided to right-shift unit 434 that shifts the mantissa of the smaller operand to the right by the indicated exponent difference. The shifted mantissa is provide to CPA 436 that combines the two mantissas and provides a combined mantissa to a normalization unit 440.

The mantissa from CPA 436 can be in the 01.xxx--xxxx, 1x.xxx--xxxx, or 0.1xxx--xxxx (from subtraction) format. Normalization unit 440 normalizes the result to the 01.xxx--xx format by performing a 1-bit right shift or left shift, if necessary. The exponent provided to exponent adjustment unit 454 is then adjusted, as necessary, based on the normalization performed by unit 440.

The normalized mantissa is provided to a rounding unit 442 that rounds the normalized mantissa and provides the rounded mantissa to a normalization unit 444. If the mantissa overflows from 01.111--11 to 10.000--00 as a result of the rounding, normalization unit 444 normalizes the rounded mantissa to the 01.xxx--xx format. Again, the exponent is adjusted by a second exponent adjustment unit 456, if necessary, based on the normalization performed by unit 444. The output from unit 444 is provided to a MUX 446.

For the MCA, the mantissas for operands S and T are provided to MUXes 432c and 432d. The MUXes facilitate a small shift of one of the mantissas, based on the exponent difference, to align the mantissas. The MUXes are also used to select one of the mantissas for inversion in subtraction operations (the inverter is not shown in FIG. 4 for simplicity). The outputs from MUXes 432c and 432d are provided to a CPA 462 and a leading zero anticipator (LZA) 464. CPA 462 combines the two mantissas and provides a combined mantissa to a left-shift unit 466. LZA 464 anticipates the number of leading zeros in the resultant mantissa, based on the input operands. The output from LZA 464 is encoded into a control signal that defines the number of shifts for left-shift unit 466. The control signal is also provided to exponent adjust 456 to adjust the exponent. The shifted mantissa is provided to MUX 446 that selects the output from the PSA or MCA as the output mantissa from adder unit 400. The adjusted exponent from unit 456 comprises the output exponent from adder unit 400.

As noted above, floating-point processors capable of performing Madd operations are desirable in many applications, such as digital signal processing and graphics. Many algorithms for these and other applications can be efficiently coded using MADD and other instructions.

Figure 5:
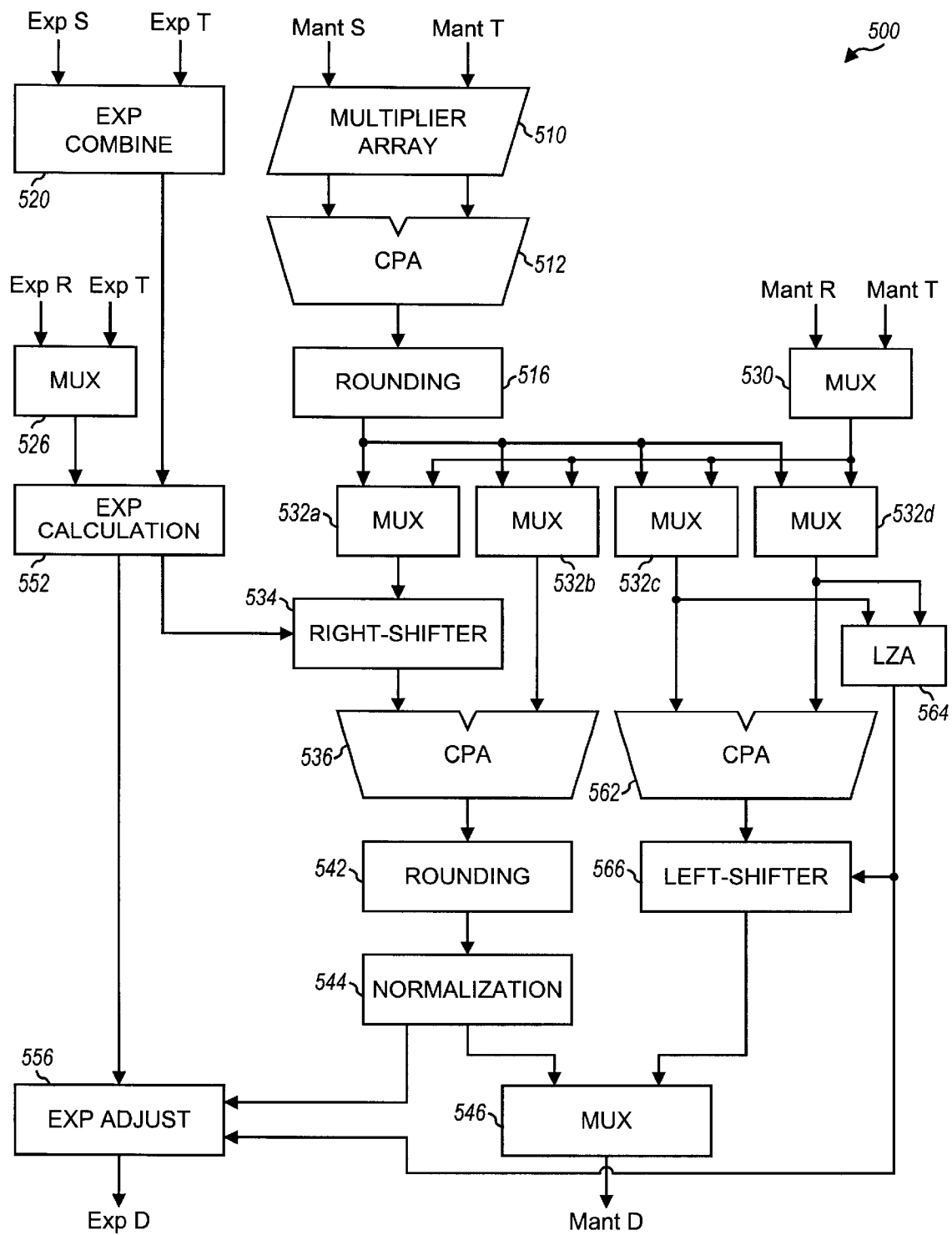
FIG. 5 shows a block diagram of an embodiment of a FPU capable of performing add, multiply, and multiply-add operations in accordance with the invention.

FIG. 5 shows a block diagram of an embodiment of a floating-point unit (FPU) 500 capable of performing add, multiply, and multiply-add operations in accordance with the invention. FPU 500 includes a multiplier unit coupled to an adder unit. Support circuitry, such as that shown in FIG. 1, is not shown in FIG. 5 for simplicity. The multiplier unit includes a multiplier array 510, a CPA 512, a rounding unit 516, and an exponent combine unit 520. The adder unit includes the remaining units shown in FIG. 5. FPU 500 includes several features that simplify the hardware architecture and improve operational performance, as described below.

At any given moment, FPU 500 can be configured to perform one of at least three different operations including addition, multiplication, and Madd. These operations are expressed by the following:

$$Fd = Fs \pm Ft,$$

$$Fd = Fs \cdot Ft,$$

and $$Fd = \pm((Fs \cdot Ft) \pm Fr)$$

where Fd is the resultant output and Fr, Fs, and Ft are three input operands. The (±) signs in the equations indicate subtraction (and MSUB) as options for these operations.

As shown in FIG. 5, the mantissas, Mant S and Mant T, for two operands are provided to multiplier array 510. Array 510 multiplies the two operands and provides the product in sum-and-carry format to CPA 512. CPA 512 combines the sum and carry and provides the resultant mantissa to a rounding unit 5 16 that rounds the mantissa. The rounded mantissa comprises the output mantissa from the multiplier unit. Array 510, CPA 512, and rounding unit 516 can be implemented similar to array 210, CPA 212, and rounding unit 214, respectively, in FIG. 2.

The exponents, Exp S and Exp T, of the two operands are provided to exponent combination unit 520 that combines the exponents for a multiply operation. The combined exponent from unit 520 comprises the output exponent from the multiplier unit.

The adder unit includes a PSA and a MCA, similar to that of FIG. 4. In the PSA, the mantissa from rounding unit 516 is provided to MUXes 532a through 532d. The mantissas for operands R and T are provided to a MUX 530 that selects one of the mantissas, based on the operation to be performed, and provides the selected mantissa to MUXes 532a through 532d. MUX 532a selects the mantissa of the smaller operand and provides the selected mantissa to a right-shift unit 534. MUX 532b selects the mantissa of the larger operand and provides the selected mantissa to a CPA 536. MUXes 532c and 532d operate in similar manner as MUXes 432c and 432d in FIG. 4.

The exponents of operands R and T are provided to a MUX 526 that selects one of the exponents based on the operation to be performed. The selected exponent from MUX 526 and the combined exponent from unit 520 are provided to an exponent calculation unit 552 that determines the difference between the two exponents and a preliminary result exponent, as described above in connection with unit 452. The preliminary result exponent (e.g., the larger exponent when performing an add operation) is provided to an exponent adjustment unit 556 and the exponent difference is provided to right-shift unit 534 that shifts the mantissa of the smaller operand to the right by the indicated exponent difference. The shifted mantissa is provided to CPA 536 that combines the two mantissas and provides a combined mantissa to a rounding unit 542. Rounding unit 542 rounds the combined mantissa and provides the rounded mantissa to a normalization unit 544 that normalizes the rounded mantissa (to place the mantissa in the 01.xxx--xx format). The exponent is adjusted by exponent adjustment unit 556, as necessary, based on the normalization performed by normalization unit 544.

The MCA portion of FPU 500 includes a CPA 562, a LZA 564, and a left-shift unit 566 that operate in similar manner as CPA 462, LZA 464, and left-shift unit 466, respectively, in FIG. 4. The outputs from normalization unit 544 and left-shift unit 566 are provided to a MUX 546 that selects the output from the PSA or MCA as the output mantissa from FPU 500. The adjusted exponent from unit 556 comprises the output exponent from FPU 500.

The FPU shown in FIG. 5 includes many of the units that make up multiplier unit 200 shown in FIGS. 2 and adder unit 400 shown in FIG. 4. However, some of the units shown in FIGS. 2 and 4 are omitted from the FPU in FIG. 5. For example, in the multiply unit, exponent adjustment units 222 and 224 and normalization units 214 and 218 are not included in FPU 500. The functions provided by these omitted units are deferred and performed by exponent adjustment unit 556 and normalization unit 544 in the adder unit. In the adder unit, exponent adjustment unit 454 and normalization unit 440 are not included in FPU 500. Again, the functions provided by these omitted units are deferred and performed by exponent adjustment unit 556 and normalization unit 544.

FIG. 6A shows two mantissa representations for the mantissa from CPA 512 in the multiplier unit. In the multiplier unit of FPU 500, normalization is not performed on the mantissa output from CPA 512. Thus, the mantissa can have either a 01.xxx--xxxx or 1x.xxx--xxxx format. Rounding unit 516 initially determines whether bit in the most significant bit (MSB) position 608 is a "0" or "1." The position of the bit to be rounded differs by one bit position depending on whether the mantissa has the 01.xxx--xxxx or 1x.xxx--xxxx format. For a mantissa having the 01.xxx--xxxx format, rounding unit 516 rounds the bit at the position indicated by an arrow 610a. Alternatively, for a mantissa having the 1x.xxx--xxxx format, rounding unit 516 rounds the bit at the position indicated by an arrow 610b. The mantissa from rounding unit 516 is rounded but not normalized.

FIG. 6B shows two mantissa representations for the mantissa from rounding unit 516. The rounded mantissa ranges from 1.0 to less than 4.0, which is approximately twice the range of a normalized mantissa. An additional bit is used to represent the additional range in the mantissa. The subsequent units (e.g., right-shift unit 534, CPA 536, rounding unit 542, and normalization unit 544 in the PSA, and CPA 562 and left-shift unit 566 in the MCA) are designed to properly process the additional bit in the mantissa.

In the PSA, CPA 536 receives two mantissas, one within a range of 1.0 and 2.0 and the other (from rounding unit 516) within the range of 1.0 to 4.0. The mantissa output from CPA 536 can range from 0.1 to 6.0 and have a format of 001.xxx--xxxx, 01x.xxx--xxxx, 1xx.xxx--xxxx, or 0.1xx--xxxx (from magnitude subtraction). Rounding unit 542 performs rounding and operates on the proper bit position based on the format of the received mantissa. Normalization unit 544 normalizes the rounded mantissa and provides the normalized mantissa to MUX 546. The exponent is adjusted (i.e., incremented by −1, 0, 1, or 2) by exponent adjustment unit 556 based on the normalization, if any, performed on the mantissa. In an embodiment, if the output from the MCA is used, at least one leading zero is guaranteed before normalization (i.e., the result has a range of 0.1xx--xxxx to 0.000--00).

FPU 500 provides many advantages over conventional Madd floating-point architectures. FPU 500 includes fewer elements than a Madd architecture formed by the concatenation of multiplier unit 200 in FIG. 2 and adder unit 400 in FIG. 4 (i.e., a concatenated Madd architecture). The exponent path of FPU 500 includes one exponent adjustment unit in contrast with four exponent adjustment units in the concatenated Madd architecture. In the mantissa path, FPU 500 includes one normalization unit 544 in contrast with four normalization units in the concatenated Madd architecture. The deferral of some of the normalization steps in FPU 500 is achieved by designing the units subsequent to CPA 512 to operate on one or two additional bits in the mantissa, which can be achieved with a small increase in complexity.

FPU 500 also provides improved performance by reducing the number of normalization steps in a floating-point operation. By eliminating three exponent adjustment operations in the exponent path, the processing time is reduced, and FPU 500 can be operated at a higher speed or with less processing delay, or both. Similarly, by eliminating three normalization units in the mantissa path, the processing time is also improved.

Various modifications can be made to the specific embodiment shown in FIG. 5. For example, one or more additional normalization units can be included in the mantissa processing portion of FPU 500. Also, the rounding function can be combined and performed by one rounding unit.

FPU 500 can be implemented in various manners. For example, FPU 500 can be implemented in hardware within a digital signal processor, an application specific integrated circuit (ASIC), a microprocessor, and other hardware structures.

In addition to implementations of the invention using hardware, the invention can also be embodied in an article of manufacture comprised of a computer usable medium configured to store a computer-readable program code. The program code causes the enablement of the functions or fabrication, or both, of the hardware disclosed in this specification. For example, this might be accomplished through the use of general programming languages (e.g., C, C++, and so on), hardware description language (HDL), register transfer language (RTL), Verilog HDL, VHDL, AHDL (Altera hardware description language), or other programming and/or circuit (i.e., schematic) capture tools available in the art. As a specific example, the Verilog simulator "VCS v.4.1.1" by Synopsys, Inc. was used to simulate the invention. A book entitled "A Verilog HDL Primer" by J. Bhasker, Star Galaxy Pr., 1997 provides greater detail on Verilog HDL, and is incorporated herein by reference in its entirety for all purposes. In the program code implementation, FIG. 5 can serve as an embodiment of a flow diagram.

It is understood that the functions accomplished by the invention as described above could be represented in a core which could be utilized in programming code and transformed to hardware as part of the production of integrated circuits. Also, other implementations of the invention (e.g., FPU 500) using a combination of hardware and software are also possible. Therefore, the embodiments expressed above are within the scope of the invention and should also be considered protected by this patent.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A floating-point unit (FPU) configurable to perform multiply-add (Madd) operations comprising:
    a multiplier unit configured to receive and multiply mantissas for first and second operands to generate a multiplier output mantissa, wherein the multiplier output mantissa is rounded and has a range greater than a normalized mantissa; and
    an adder unit coupled to the multiplier unit, the adder unit configured to receive and combine the multiplier output mantissa with the greater range and a mantissa for a third operand to generate a FPU output mantissa.

2. The FPU of claim 1, wherein the adder unit is further configured to round the mantissa generated by combining the multiplier output mantissa and the mantissa for the third operand, and to normalize the rounded mantissa to generate the FPU output mantissa.

3. The FPU of claim 1, wherein the multiplier output mantissa includes at least two bits of precision on a left side of a binary point.

4. The FPU of claim 1, wherein the multiplier output mantissa is rounded based on a precision of the mantissas for the first and second operands.

5. The FPU of claim 1, wherein the multiplier output mantissa is rounded in accordance with IEEE standard.

6. The FPU of claim 1, wherein the multiplier output mantissa has a format of 01.xxx--xx or 1x.xxx--xx.

7. A processor for manipulating numerical data comprising the FPU of claim 1.

8. A floating-point processor configurable to perform multiply-add (Madd) operations comprising:
    a multiplier unit that includes
        a multiplier array configured to receive and multiply mantissas for first and second operands, and
        a first rounding unit operatively coupled to the multiplier array, the first rounding unit configured to round an unnormalized output from the multiplier array; and
    an adder unit coupled to the multiplier unit, the adder unit includes
        a carry propagation adder (CPA) configured to receive and combine a rounded unnormalized mantissa from the multiplier unit and a mantissa for a third operand,
        a second rounding unit coupled to the CPA, the second rounding unit configured to receive and round a mantissa from the CPA, and
        a normalization unit coupled to the second rounding unit, the normalization unit configured to receive and normalize a rounded mantissa from the second rounding unit.

9. The processor of claim 8, wherein the multiplier unit further includes
    a CPA coupled between the multiplier array and the first rounding unit, the CPA configured to receive and combine a sum output and a carry output from the multiplier array.

10. The processor of claim 8,
    wherein the multiplier unit further includes
        an exponent combination unit configured to receive and combine exponents of the first and second operands,
    and wherein the adder unit further includes
        an exponent calculation unit configured to receive a combined exponent from the exponent combination unit and an exponent for the third operand, and
        an exponent adjustment unit coupled to the exponent calculation unit, the exponent adjustment unit configured to receive and adjust an output from the exponent calculation unit.

11. The processor of claim 10, wherein the exponent calculation unit is further configured to determine a difference in the combined exponent from the exponent combination unit and the exponent for the third operand, and wherein the adder unit further includes
    a right-shift unit coupled between the first rounding unit in the multiplier unit and the CPA in the adder unit, the right-shift unit configured to receive and shift a mantissa by an amount based on the determined difference in the exponents.

12. The processor of claim 8, wherein the first rounding unit in the multiplier unit is configured to round the received mantissa in accordance with IEEE standard.

13. The processor of claim 12, wherein the mantissa from the first rounding unit has two bits of precision on a left side of a binary point.

14. The processor of claim 8 wherein the rounded mantissa from the multiplier unit has a range greater than a normalized mantissa.

15. A method for performing a floating-point multiply-add (Madd) operation comprising:

multiplying mantissas for first and second operands to generate a third mantissa;

rounding the third mantissa to generate a fourth mantissa, wherein the fourth mantissa has a range greater than a normalized mantissa; and combining the fourth mantissa with the greater range and a mantissa for a third operand to generate an output mantissa.

16. The method of claim 15, further comprising:

rounding a mantissa from the combination of the fourth mantissa and the mantissa for the third operand; and normalizing the rounded mantissa to generate the output mantissa.

17. The method of claim 15, wherein the multiplying generates sum and carry outputs, the method further comprising:

combining the sum and carry outputs to generate the third mantissa.

18. The method of claim 15, wherein the fourth mantissa is rounded based on precision of the mantissas for the first and second operands.

19. An article of manufacture comprising:

computer-readable program code for causing a computer to describe a multiplier unit, wherein the multiplier unit is configured to receive and multiply mantissas for first and second operands to generate a multiplier output mantissa, wherein the multiplier output mantissa is rounded and has a range greater than a normalized mantissa;

computer-readable program code for causing the computer to describe an adder unit, wherein the adder unit is coupled to the multiplier unit and configured to receive and combine the multiplier output mantissa with the greater range and a mantissa for a third operand to generate, a FPU output mantissa; and a computer-usable medium configured to store the computer-readable program codes.

20. An article of manufacture comprising:

computer-readable program code for causing a computer to describe a multiplier unit, wherein the multiplier unit includes a multiplier array operatively coupled to a first rounding unit, wherein the multiplier array is configured to receive and multiply mantissas for first and second operands, and wherein the first rounding unit is configured to round an unnormalized output from the multiplier array;

computer-readable program code for causing the computer to describe an adder unit, wherein the adder unit couples to the multiplier unit and includes a carry propagation adder (CPA), a second rounding unit, and a normalization unit, wherein the CPA is configured to receive and combine a rounded unnormalized mantissa from the multiplier unit and a mantissa for a third operand, wherein the second rounding unit is coupled to the CPA and configured to receive and round a mantissa from the CPA, and wherein the normalization unit is coupled to the second rounding unit and configured to receive and normalize a rounded mantissa from the second rounding unit; and a computer-usable medium configured to store the computer-readable program codes.

21. A computer program product for performing a floating-point multiply-add (Madd) operation comprising:

code that multiplies mantissas for first and second operands to generate a third mantissa;

code that rounds the third mantissa to generate a fourth mantissa, wherein the fourth mantissa has a range greater than a normalized mantissa;

code that combines the fourth mantissa with the greater range and a mantissa for a third operand to generate an output mantissa; and a data storage medium configured to store the codes.

22. A computer program product comprising:

code that defines a multiplier unit, wherein the multiplier unit is defined to receive and multiply mantissas for first and second operands to generate a multiplier output mantissa, wherein the multiplier output mantissa is rounded and has a range greater than a normalized mantissa;

code that defines an adder unit, wherein the adder unit is coupled to the multiplier unit and defined to receive and combine the multiplier output mantissa with the greater range and a mantissa for a third operand to generate a FPU output mantissa; and a data storage medium configured to store the codes.

* * * * *